(12) United States Patent
Lee et al.

(10) Patent No.: US 10,847,865 B2
(45) Date of Patent: Nov. 24, 2020

(54) ANTENNA ALIGNMENT GUIDE DEVICE

(71) Applicant: KMW INC., Hwaseong-si (KR)

(72) Inventors: Dong-Hun Lee, Hwaseong-si (KR);
Yong-Hyo Jun, Hwaseong-si (KR);
Min-Ji Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 16/186,614

(22) Filed: Nov. 12, 2018

(65) Prior Publication Data

US 2019/0081382 A1 Mar. 14, 2019

Related U.S. Application Data

(63) Continuation of application No. PCT/KR2017/004877, filed on May 11, 2017.

(30) Foreign Application Priority Data

May 12, 2016 (KR) .......................... 10-2016-0058210

(51) Int. Cl.
*H01Q 1/12* (2006.01)
*G01C 5/00* (2006.01)
(Continued)

(52) U.S. Cl.
CPC ............. *H01Q 1/1257* (2013.01); *G01C 5/00* (2013.01); *G01C 17/00* (2013.01); *H01Q 1/12* (2013.01);
(Continued)

(58) Field of Classification Search
CPC ........ H01Q 1/1257; H01Q 3/005; H01Q 3/08; H01Q 1/12; H04B 1/40; G01C 5/00; G01C 17/00; G06F 3/0488; G01S 19/01
See application file for complete search history.

(56) References Cited

U.S. PATENT DOCUMENTS

2009/0033576 A1* 2/2009 Smoyer .................. H01Q 1/125
343/761
2010/0182199 A1* 7/2010 Jeong .................... G01S 7/4026
342/374
(Continued)

FOREIGN PATENT DOCUMENTS

JP 2013-165406 A 8/2013
KR 10-2002-0020529 A 3/2002
(Continued)

OTHER PUBLICATIONS

International Search Report for PCT/KR2017/004877 dated Aug. 8, 2017 and its English translation.

*Primary Examiner* — Lewis G West

(57) ABSTRACT

The present disclosure relates to an antenna alignment guide device between pieces of communication equipment, the device comprising: a sensor unit for sensing an azimuth of the alignment guide device and information on the location thereof; a user interface unit for displaying the information on the location sensed by the sensor unit and for receiving an operation setting input and information on the location of another device; and a fixing device for mounting, in an aligned state, the alignment guide device in a preset part of communication equipment on the basis of a wireless signal radiation direction of the communication equipment.

18 Claims, 7 Drawing Sheets

(51) Int. Cl.
*G01C 17/00* (2006.01)
*H01Q 3/00* (2006.01)
*H01Q 3/08* (2006.01)
*H04B 1/40* (2015.01)
*G01S 19/01* (2010.01)
*G06F 3/0488* (2013.01)

(52) U.S. Cl.
CPC ............ *H01Q 3/005* (2013.01); *H01Q 3/08* (2013.01); *H04B 1/40* (2013.01); *G01S 19/01* (2013.01); *G06F 3/0488* (2013.01)

(56) References Cited

U.S. PATENT DOCUMENTS

| | | | | |
|---|---|---|---|---|
| 2014/0266925 | A1* | 9/2014 | Dalmazzo | H01Q 1/243 |
| | | | | 343/702 |
| 2015/0097736 | A1* | 4/2015 | Dalmazzo | H01Q 1/243 |
| | | | | 343/702 |
| 2016/0056525 | A1* | 2/2016 | Hansryd | H01Q 1/1257 |
| 2016/0211576 | A1* | 7/2016 | Vassilakis | H01Q 1/125 |
| 2016/0316359 | A1* | 10/2016 | So | H01Q 3/08 |
| 2017/0149129 | A1* | 5/2017 | Dalmazzo | H01Q 1/243 |

FOREIGN PATENT DOCUMENTS

| | | |
|---|---|---|
| KR | 10-2007-0084903 A | 8/2007 |
| KR | 10-1403399 B1 | 6/2014 |
| KR | 10-2014-0144588 A | 12/2014 |

\* cited by examiner

[FIG. 1]
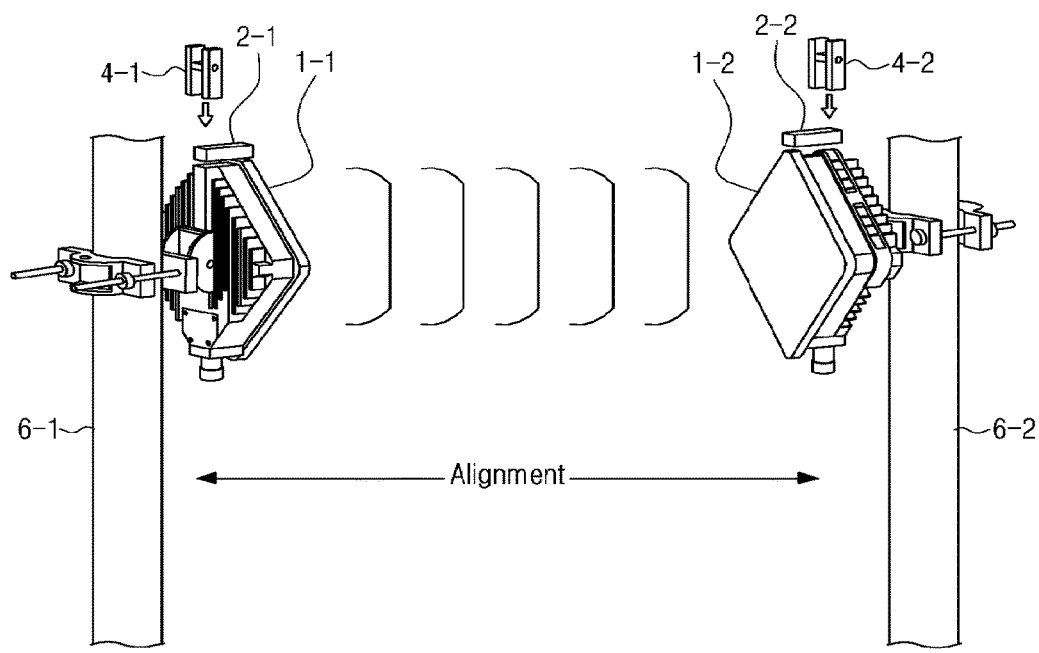

[FIG. 2]
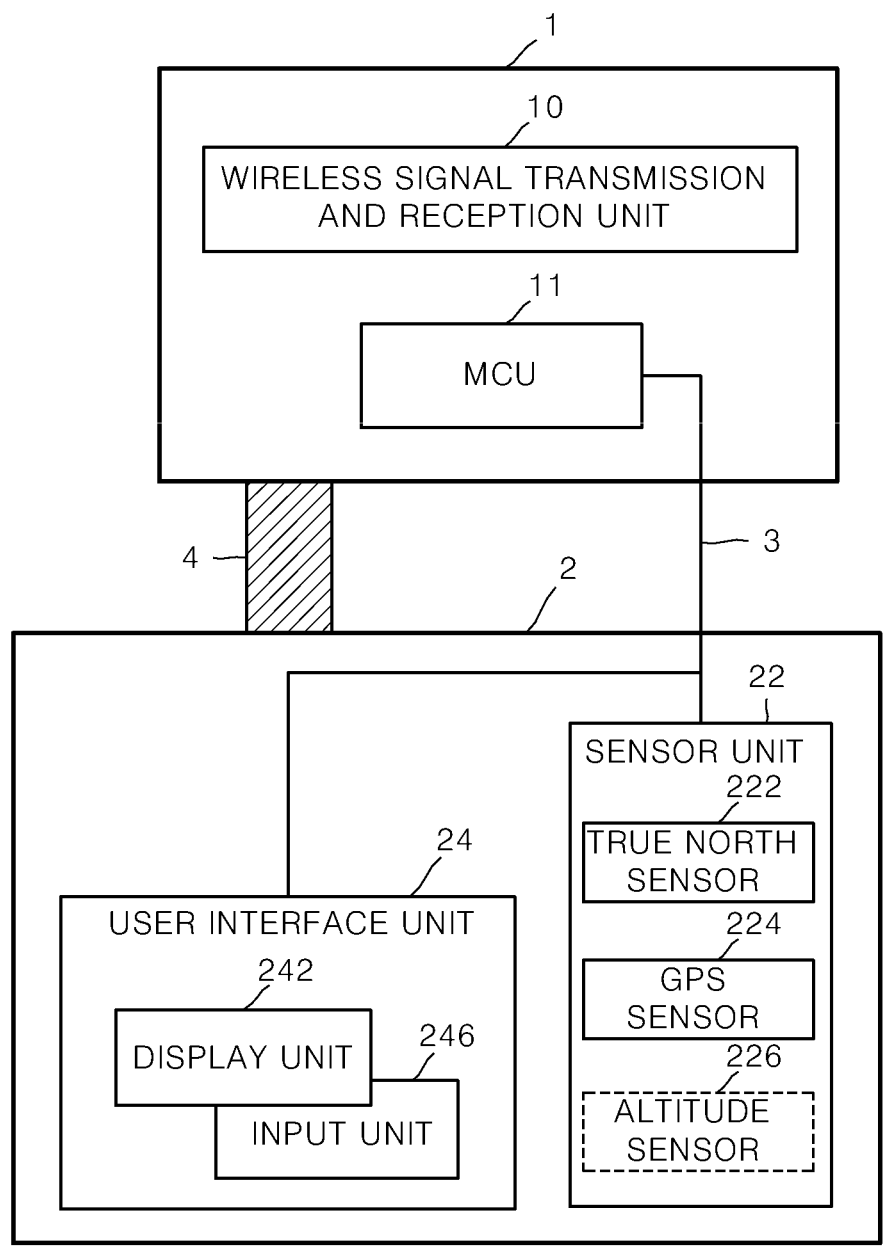

【FIG. 3】
【FIG. 4】
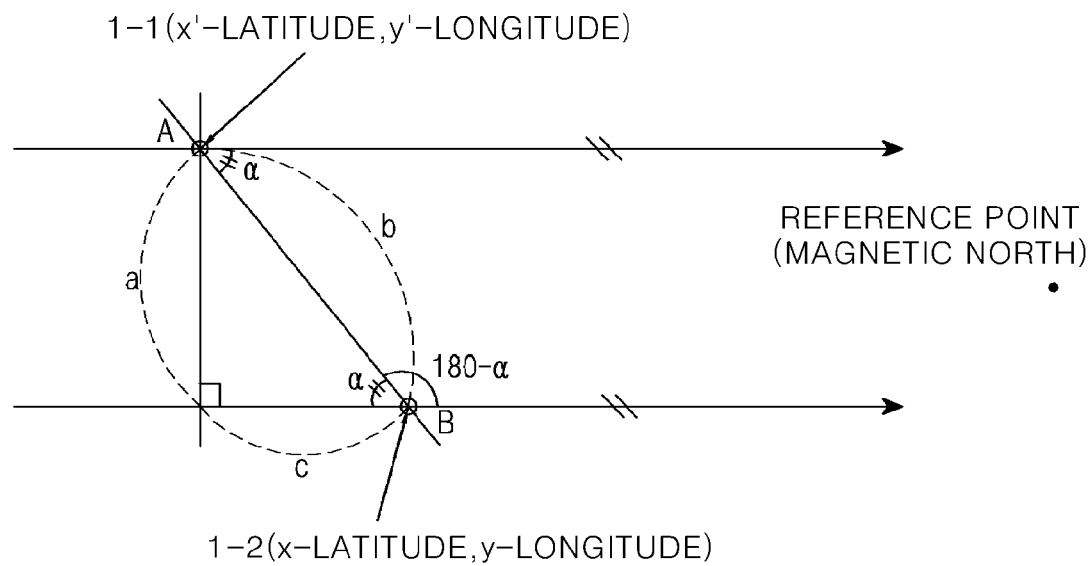

[FIG. 5]
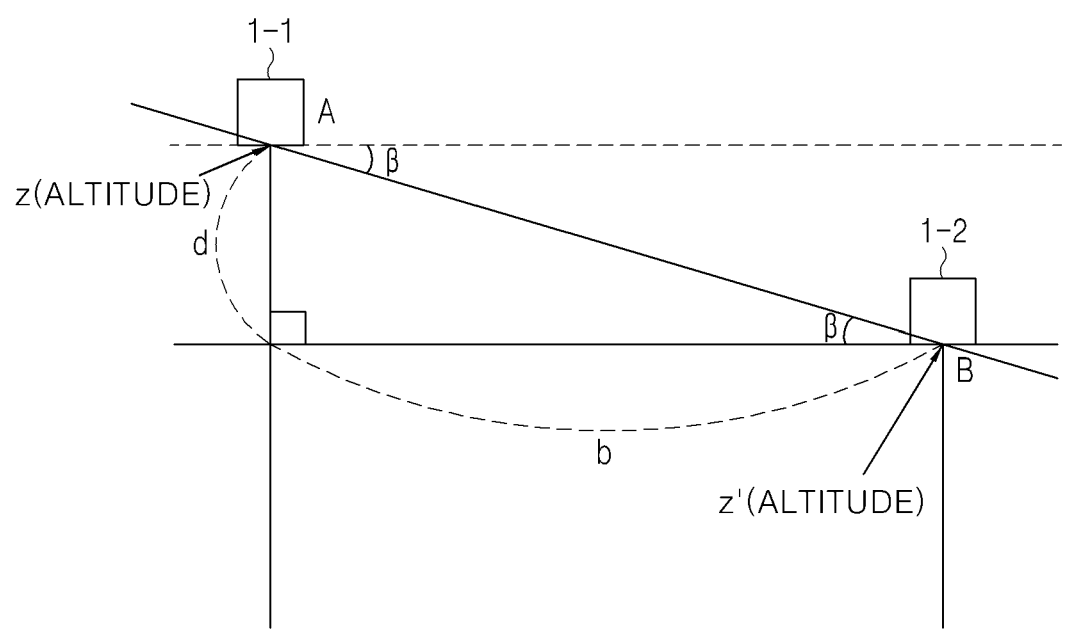

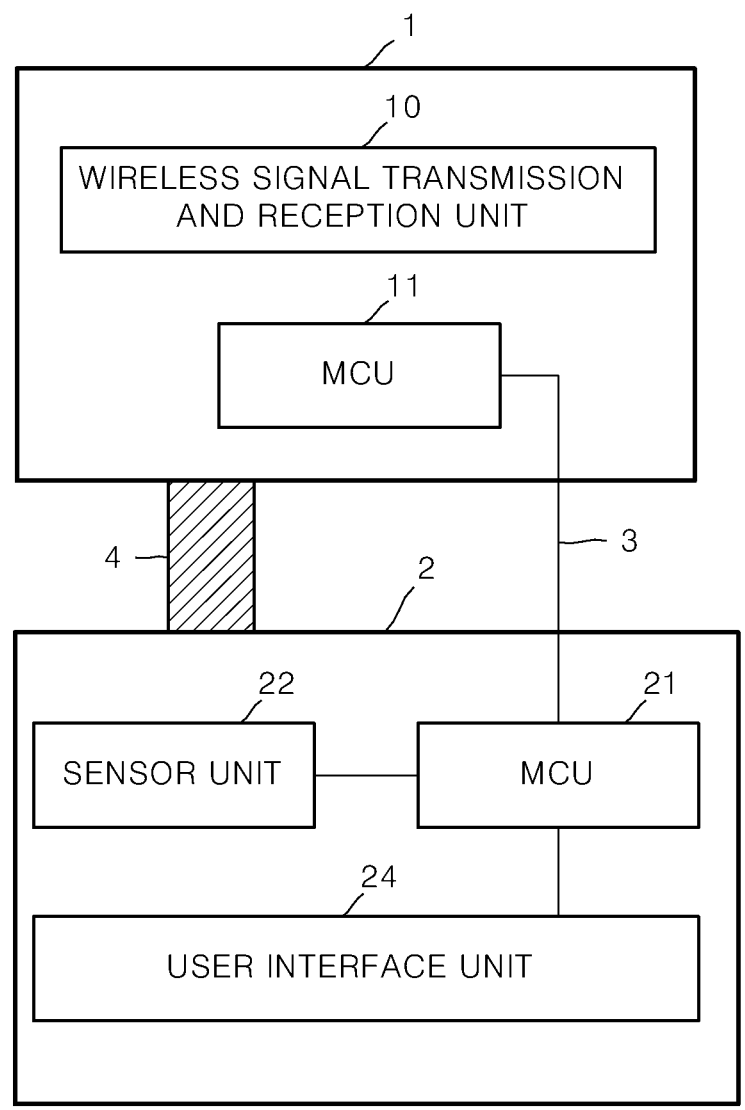
[FIG. 6]

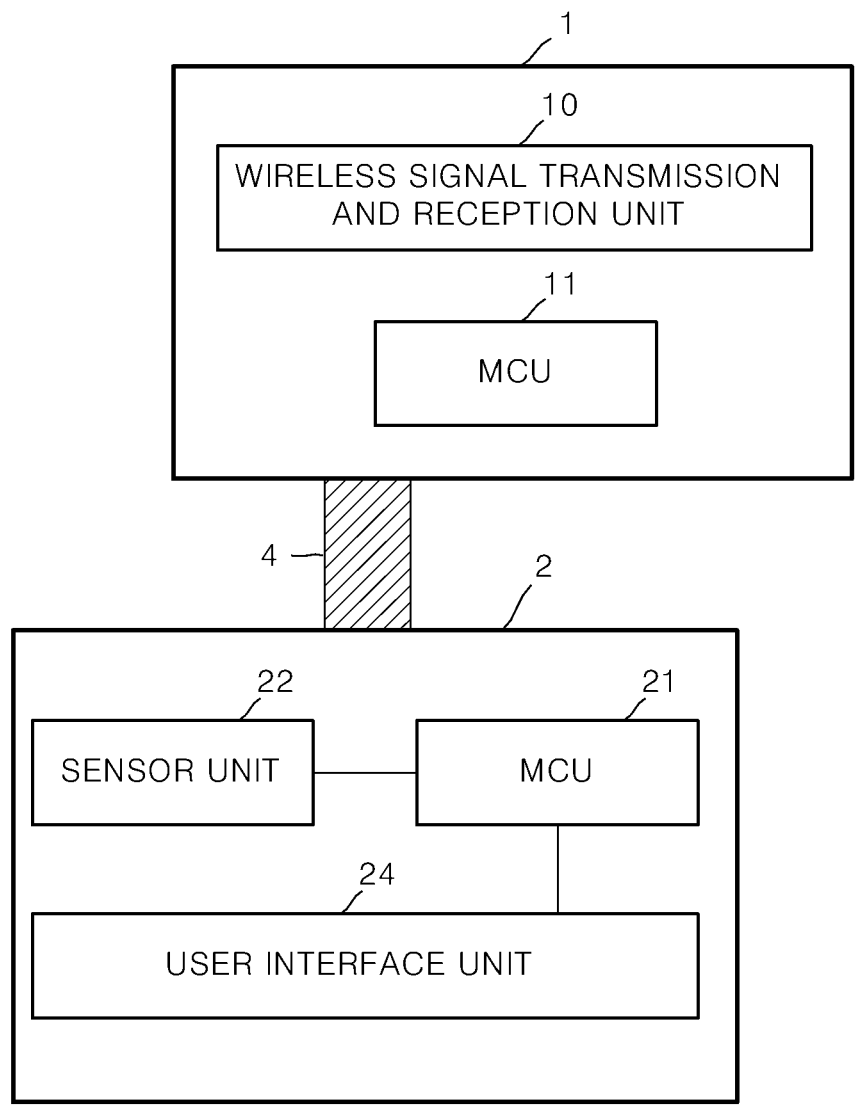
[FIG. 7]

[FIG. 8]
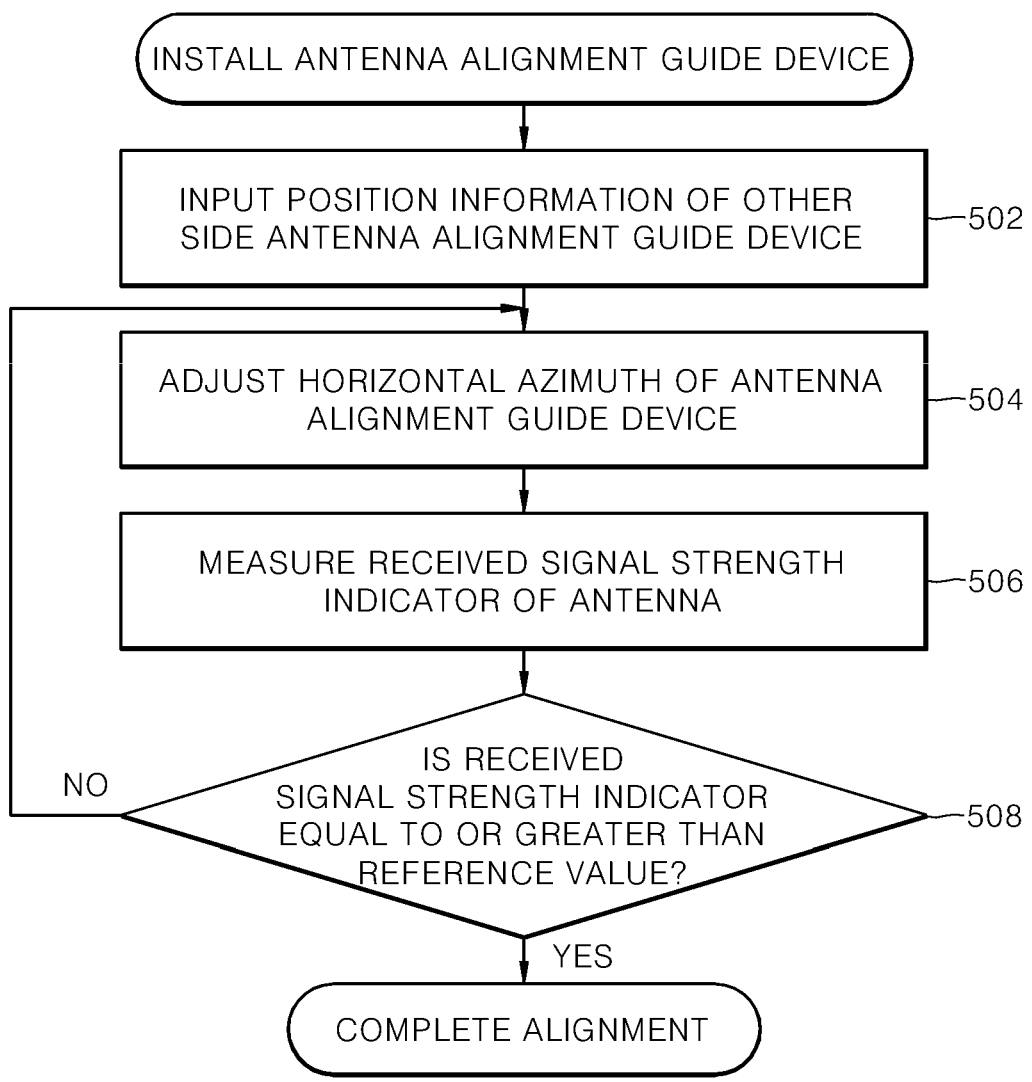

ANTENNA ALIGNMENT GUIDE DEVICE

CROSS-REFERENCE TO RELATED APPLICATIONS

This application is a Continuation of International Application No. PCT/KR2017/004877, filed on May 11, 2017, which claims the benefit of and priority to Korean Patent Application No. 10-2016-0058210, filed on May 12, 2016, the content of which are herein incorporated by reference in their entirety.

TECHNICAL FIELD

The present disclosure relates to communication equipment applicable to a microwave transmission system, and more particularly, to an antenna alignment guide device for aligning directions between antennas of two communication equipments in a microwave transmission system.

BACKGROUND ART

Recently, in order to satisfy a service subscriber requiring a large capacity data service, various researches including a multiple input multiple output (MIMO) method of a long term evolution (LET) have been carried out so as to transmit more efficient and more data in a limited frequency band. Additionally, in addition to a method of implementing a base station in an existing macrocell unit, researches and developments have been actively carried out on a method of intensively providing data services to a small number of subscribers and a small or micro base station for performing the method by implementing a plurality of base stations in a smaller cell (so-called as a small cell) unit.

In this case, a conventional method of connecting between the base stations through an optical cable or the like increases significant installation costs and difficulties due to restriction of an installation environment when the conventional method is applied to connect a plurality of small-sized base stations. Accordingly, a system for connecting between base stations or small-sized base stations through wireless communication equipment has become necessary, and a microwave transmission system (e.g., a fronthaul and a backhaul) has been applied now to be capable of efficiently processing a data capacity of the small-sized cell in wireless manner and of using a millimeter wave (microwave broadband millimeter wave) band in consideration of a saturation of a frequency band in a mobile communication network.

Meanwhile, a millimeter wave has a characteristics of strong directivity and a characteristic (attenuation characteristic) in which the millimeter wave is decreased and disappeared with distance. Further, a gain is high and a beam width is very narrow, e.g., about 1.5 degrees. Therefore, an alignment between two communication equipments for transmitting and receiving a microwave signal (i.e., an alignment between antennas of the two communication equipments) should be accurate to increase an available communication distance between the two communication equipments and to reduce a mutual influence between adjacent communication equipments because signals radiated out of a bore-sight are weak. Accordingly, when two communication equipments are installed, a task for mutually aligning the two communication equipments should be performed.

However, the task for mutually aligning between antennas of two communication equipments installed at a distance of several hundred meters (e.g., about 500 meters) is conventionally performed by a worker using a naked eye or a telescope. Such alignment operation is lacking in precision, takes a long period of time, and increases installation costs, thereby degrading installation efficiency. Therefore, there is a need for a technique for aligning antennas of two communication equipments in a more accurate, efficient, and quick manner.

DISCLOSURE

Technical Problem

It is an objective of the present disclosure to provide an antenna alignment guide device for performing accurately, efficiently, and rapidly an antenna alignment operation of two communication equipments for transmitting and receiving a microwave signal.

Technical Solution

According to one aspect of the present disclosure, there is provided an antenna alignment guide device between communication equipments, which includes a sensor unit configured to sense information on azimuth and a position of the antenna alignment guide device, a user interface unit configured to display the information on the position sensed by the sensor unit and receive an operation setting input and information on a position of other side communication equipment, and a fixing device configured to detachably fix the antenna alignment guide device at a predetermined portion of the communication equipment in a state in which the antenna alignment guide device is aligned about a wireless signal radiation direction of the communication equipment.

The sensor unit may include a true north sensor configured to sense the azimuth of the antenna alignment guide device and a global positioning system (GPS) sensor configured to sense the antenna alignment guide device, and may further include an altitude sensor configured to sense an installed height of the antenna alignment guide device.

The antenna alignment guide device may be connected to the communication equipment and is operated under the control of the communication equipment, and the antenna alignment guide device may receive and display received signal strength indicator (RSSI) information from the communication equipment.

The antenna alignment guide device may further include a control unit configured to collectively control an operations of the antenna alignment guide device, wherein the control unit performs an operation of outputting information on an installation direction of the antenna alignment guide device via the user interface unit so as to direct the antenna alignment guide device to a position of the other side communication equipment using the position information and the azimuth information, which are provided from the sensor unit, and the position information of the other side communication equipment, which is input from the user interface unit.

The control unit may perform an operation of outputting the information on the installation direction of the antenna alignment guide device via the user interface unit using altitude information provided from the sensor unit and an altitude of the other side communication equipment, which is input from the user interface unit.

Advantageous Effects

As described above, in accordance with embodiments of the present disclosure, the antenna alignment guide device can particularly perform accurately, efficiently, and rapidly an antenna alignment operation of two communication equipments for transmitting and receiving a microwave signal.

BRIEF DESCRIPTION OF THE DRAWINGS

FIG. 1 is a schematic block diagram of communication equipment to which an antenna alignment guide device according to some embodiments of the present disclosure is applied.

FIG. 2 is a schematic block diagram of an antenna alignment guide device and related communication equipment according to a first embodiment of the present disclosure.

FIG. 3 is a conceptual diagram of an alignment method between communication equipments using the antenna alignment guide device according to some embodiments of the present disclosure.

FIG. 4 is a conceptual diagram for aligning mutual horizontal azimuth between communication equipments when an alignment task is performed therebetween using the antenna alignment guide device according to some embodiments of the present disclosure.

FIG. 5 is a conceptual diagram for aligning mutual vertical inclination between communication equipments when the alignment task is performed therebetween using the antenna alignment guide device according to some embodiments of the present disclosure.

FIG. 6 is a schematic block diagram of an antenna alignment guide device and related communication equipment according to a second embodiment of the present disclosure.

FIG. 7 is a schematic block diagram of an antenna alignment guide device and related communication equipment according to a third embodiment of the present disclosure.

FIG. 8 is a flowchart illustrating the alignment task of communication equipment using the antenna alignment guide device according to some embodiments of the present disclosure.

BEST MODE

Hereinafter, preferred embodiments of the present disclosure will be described in detail with reference to the accompanying drawings. In the following description, specific items such as specific components are described, these specific items are provided only for helping a better understanding of the present disclosure, and it will be apparent to those skilled in the art that various modifications and variations of these specific items can be derived without departing from the scope of the present disclosure.

FIG. 1 is a schematic block diagram of communication equipment to which a device according to some embodiments of the present disclosure is applied. For example, referring to FIG. 1, two first and second communication equipments 1-1 and 1-2 for transmitting and receiving a wireless signal using a microwave of 30 GHz or more in a millimeter wave band may be installed at supporting pillars 6 capable of being installed at the ground or building in a form facing each other at a distance of several hundred meters or more. For example, among these communication equipment, the first communication equipment 1-1 may be regarded as a donor unit, and the second communication equipment 1-2 may be regarded as a remote unit. In this case, the first and second communication equipments 1-1 and 1-2 are respectively fixed to supporting pillars 6-1 and 6-2 by a fixing device constituted with a clamp and the like which are capable of adjusting installation posture for horizontal azimuth and vertical inclination.

In the above-described structure, antenna alignment guide devices 2-1 and 2-2 according to embodiments of the present disclosure are respectively detachably installed at outer sides of the first and second communication equipments 1-1 and 1-2. In the example of FIG. 1, the antenna alignment guide devices 2-1 and 2-2 have respectively been shown to be placed at upper portions of the first and second communication equipments 1-1 and 1-2. At this point, directions in which the antenna alignment guide devices 2-1 and 2-2 are installed are aligned to be opposite to each other about directions in which wireless signals in a the millimeter wave band are irradiated from antennas of the first and second communication equipments 1-1 and 1-2. In this case, the first and second communication equipments 1-1 and 1-2 may have suitable shapes or additional structures may be installed at the first and second communication equipments 1-1 and 1-2 so as to allow the antenna alignment guide devices 2-1 and 2-2 to be placed at predetermined positions.

Further, separate fixing devices 4-1 and 4-2 may be configured to detachably fix the antenna alignment guide devices 2-1 and 2-2 at predetermined positions of the first and second communication equipments 1-1 and 1-2. These fixing devices 4-1 and 4-2 are configured with a clamp structure or a bracket structure and have portions corresponding to the antenna alignment guide devices 2-1 and 2-2 and the first and second communication equipments 1-1 and 1-2, thereby respectively fixing the antenna alignment guide devices 2-1 and 2-2 to the first and second communication equipments 1-1 and 1-2.

FIG. 2 is a schematic block diagram of an antenna alignment guide device and related communication equipment according to a first embodiment of the present disclosure. Looking at a configuration of a communication equipment 1 with reference to FIG. 2, the communication equipment 1 includes a wireless signal transmission and reception unit 10 configured to transmit and receive a wireless millimeter wave signal and having an antenna of a millimeter wave band, and a micro control unit (MCU) 11 which is a control unit configured to collectively control an operation of the communication equipment 1.

Meanwhile, an antenna alignment guide device 2 basically includes a sensor unit 22 configured to sense information on azimuth and a position of a corresponding antenna alignment guide device, and a user interface unit 24 configured to display the information on the position sensed by the sensor unit 22 and receive an operation setting input and information on a position of another device. Further, the user interface unit 24 displays an installation direction of the corresponding antenna alignment guide device 2 (i.e., horizontal azimuth) in response to the information of the position of another device.

The sensor unit 22 may include a true north sensor 222 configured to sense azimuth of a corresponding antenna alignment guide device, and a global positioning system (GPS) sensor 224 configured to sense a position of the corresponding antenna alignment guide device. Further, the sensor unit 22 may include an altitude sensor configured to sense an installed height of the corresponding antenna alignment guide device.

The user interface unit 24 may include a display unit 242 configured to display the information on the position sensed by the sensor unit 22 to a user, and an input unit 246 configured to receive an operation setting input and information on a position of another devices. The display unit 242 and the input unit 246 may be integrally implemented with a touch screen or the like. As described below, in addition to the foregoing, the display unit 242 may display received signal strength indicator (RSSI) information of corresponding communication equipment and may display an appropriate menu screen for receiving an operation setting from the user. Further, in addition to the foregoing, the input unit 246 may be provided with a separate function key for manipulating the operation setting.

For example, the antenna alignment guide device 2 having the above-described configuration is installed at an upper portion of the communication equipment 1 in a state of being aligned about an irradiation direction of a wireless signal from the wireless signal transmission and reception unit 10 of the communication equipment 1. In FIG. 2, a fixing device 4 for installing the antenna alignment guide device 2 at the communication equipment 1 is schematically shown.

Further, the antenna alignment guide device 2 and the communication equipment 1 may be configured to transmit and receive signals with each other by being connected via a communication interface 3 which is constituted with a communication cable, a connector, and the like. Accordingly, the MCU 11 of the communication equipment 1 may be connected to the sensor unit 22 and the user interface unit 24 of the antenna alignment guide device 2 via the communication interface 3 to control operations of the sensor unit 22 and the user interface unit 24. That is, it can be seen that this configuration is a structure in which the antenna alignment guide device 2 is operated under the control of the MCU 11 of the communication equipment 1.

When the antenna alignment guide device 2 is installed at the communication equipment 1 and the antenna alignment guide device 2 and the communication equipment 1 are interconnected, a worker adjusts an installation posture of the communication equipment 1 through the antenna alignment guide device 2. In this case, the worker inputs position information of other side communication equipment (i.e., a guide alignment device installed at the other side communication equipment) through the user interface unit 24. The position information of the other side communication equipment, which is input to the user interface unit 24, is provided to the MCU 11 of the communication equipment 1.

In consideration of the position information and the azimuth information of the communication equipment 1, which are provided from the sensor unit 22, and the position information of the other side communication equipment, which are provided from the user interface unit 24, the MCU 11 outputs information on an installation direction of the communication equipment 1 (i.e., horizontal azimuth) via the user interface unit 24 to direct the installation position of the other side communication equipment. Accordingly, the azimuth of the other side communication equipment (i.e., the corresponding antenna alignment guide device) and azimuth for a required installation direction may be displayed on the user interface unit 24, and the worker confirms the output information to adjust an installation direction of the communication equipment 1 (horizontal azimuth).

At this point, the MCU 11 of the communication equipment 1 may control the RSSI information of the wireless signal, which is received via the wireless signal transmission and reception unit 10, to be displayed through the user interface unit 24, and the worker may adjust more precisely the installation direction of the communication equipment 1 on the basis of the RSSI information. That is, when the RSSI is good, the worker may regard the installation direction of the communication equipment as being appropriately adjusted.

There are two methods for measuring RSSI in the communication equipment 1. For example, a method of confirming an output voltage of the wireless signal transmission and reception unit 10 of the communication equipment 1 may be used. Alternatively, a method of confirming an RSSI of a wireless communication (e.g., FSK, Zigbee, or the like) modem in a low frequency range for controlling the communication equipment 1 may be used.

Further, the worker may input altitude information of other side communication equipment (i.e., a guide alignment device installed at the other side communication equipment) through the user interface unit 24. Furthermore, it may be configured such that the altitude information sensed by the altitude sensor 226 of the sensor unit 22 is provided to the MCU 11. Moreover, in consideration of the altitude information of the communication equipment 1, which is provided from the sensor unit 22, and the altitude information of the other side communication equipment, which is provided from the user interface unit 24, the MCU 11 may output information on an installation direction of the communication equipment 1 (i.e., vertical inclination) via the user interface unit 24 to direct the installation position of the other side communication equipment. Accordingly, the worker confirms the output information to further adjust the installation direction (vertical inclination) of the communication equipment 1.

FIG. 3 is a conceptual diagram of an alignment method between communication equipments using the antenna alignment guide device according to some embodiments of the present disclosure. Referring to FIG. 3, first and second communication equipments 1-1 and 1-2 for transmitting and receiving a wireless microwave signal may be installed apart, e.g., about 500 m or less, and a direction of true north or magnetic north sensed by a sensor unit of antenna alignment guide device 2-1 or 2-2 may be spaced apart, e.g., hundreds or thousands of kilometers, from the first or second communication equipment 1-1 or 1-2. Therefore, when true north values or magnetic north values sensed by the antenna alignment guide devices 2-1 and 2-2 of the first and second communication equipments 1-1 and 1-2 becomes zero (i.e., communication equipment is directed to north), it may be considered that the first and second communication equipments 1-1 and 1-2 are placed on a parallel line.

FIG. 4 is a conceptual diagram for aligning mutual horizontal azimuth between communication equipments when an alignment task is performed therebetween using the antenna alignment guide device according to some embodiments of the present disclosure, and as described in FIG. 3, FIG. 4 illustrates a method of finding out an angle α for which two points (i.e., Points A and B at which two communication equipment are located) on two parallel lines face to each other. Referring to FIG. 4, in consideration of a right-angled triangle having two vertexes of Points A and B at which the two communication equipment are located, when lengths of two among three sides a, b, and c of the right-angled triangle in FIG. 4 are calculated, the angle α may be calculated through a trigonometric ratio.

For example, with GPS coordinates through GPS sensors of each of the two communication equipment, a north-south distance a may be obtained by calculating a latitude difference [x–x'] between Points A and B through latitude coordinates. An east-west distance c may be obtained by calculating a longitude difference [y–y'] between Points A and B through longitude coordinates. In this case, a straight line distance b between the two communication equipment is the square root of $[a^2+c^2]$, and the straight line distance b may be obtained through a function of the GPS. For example, a value of sin α may be calculated as a/b using the obtained lengths of a, b, and c, and the angle α may be finally calculated.

For example, using the angle α which is calculated as described above, when the first communication equipment 1-1 located at a lower side (south) on latitude as shown in FIG. 4 is located more west on longitude than the second communication equipment 1-2, azimuth (yaw or heading) of the first communication equipment 1-1 is moved to east by the angle α about the north direction. When the first communication equipment 1-1 is located more east on longitude than the second communication equipment 1-2, the azimuth of the first communication equipment 1-1 is moved to west by the angle α.

When the second communication equipment 1-2 located at an upper side (north) on latitude is located more east than the first communication equipment 1-1 on longitude, azimuth of the second communication equipment 1-2 is moved by an angle 180-α in the west direction, when the second communication equipment 1-2 is located more west on longitude than the first communication equipment 1-1, the azimuth of the second communication equipment 1-2 is moved by the angle 180-α in the east direction.

FIG. 5 is a conceptual diagram for aligning mutual vertical inclination between communication equipments when an alignment task is performed therebetween using the antenna alignment guide device according to some embodiments of the present disclosure, and FIG. 5 illustrates a method of finding out an angle β for which two points (i.e., Points A and B at which two communication equipment are located) having different heights face to each other. Referring to FIG. 5, in consideration of a right-angled triangle having two vertexes of Points A and B at which the two communication equipment are located, the angle β may be calculated through a trigonometric ratio as similar to the method described in FIG. 4.

That is, an altitude difference d, i.e., [z-z'], between the two communication equipment may be calculated using a straight line distance b between the two communication equipment, which are calculated through the method as shown in FIG. 4, and altitude sensors provided at the two communication equipment. For example, a value of tan β may be calculated as d/b using the calculated b and d, and the angle β may be finally calculated.

For example, using the calculated angle β as described above, pitch of the first communication equipment 1-1 located at a higher position as shown in FIG. 5 is moved by the angle β in a ground direction, and pitch of the second communication equipment 1-2 located at a lower position is moved by the angle β in a direction opposite the ground direction.

As shown in FIGS. 4 and 5, the azimuth and inclination of each of the two communication equipment may be aligned, and at this point, an alignment state for the two communication equipment may exhibit an error of, e.g., about 8.5 m per one degree (17 mm) on the basis of a distance of 500 m. In consideration of an average error of a commercially available sensor is 0.3 or less, an error distance of about 2.83 m may be generated with an error of 0.3 degrees from 500 m. This may be in a stable range in some cases, but in some embodiments of the present disclosure, this error may be corrected through additional measurement of an RSSI between the two communication equipment and an additional fine adjustment according to the measurement.

FIG. 6 is a schematic block diagram of an antenna alignment guide device and related communication equipment according to a second embodiment of the present disclosure. Referring to FIG. 6, like the configuration according to the first embodiment as shown in FIG. 2, an antenna alignment guide device 2 according to the second embodiment of the present disclosure includes a sensor unit 22 configured to sense azimuth and information on a position of corresponding communication equipment, and a user interface unit 24 configured to display the information on the position sensed by the sensor unit 22 and receive an operation setting input and information on a position of another device. Further, the user interface unit 24 displays an installation direction of the corresponding antenna alignment guide device 2 (i.e., horizontal azimuth) in response to the information of the position of another device.

Furthermore, like the first embodiment, in the antenna alignment guide device according to the second embodiment shown in FIG. 6, the sensor unit 22 may include a true north sensor, a GPS sensor, an altitude sensor, and the like. Moreover, the user interface unit 24 may include a display unit and an input unit and may be implemented as a touch screen. In addition to the foregoing, the antenna alignment guide device 2 shown in FIG. is connected to a communication equipment 1 through a communication interface 3 and is installed at the communication equipment 1 via a fixing device 4. When the worker inputs position information and altitude information of other side communication equipment (i.e., a guide alignment device installed at the other side communication equipment) through the user interface unit 24, the input position information and the input altitude information of the other side communication equipment are input to an MCU 21 of the antenna alignment guide device 2.

In consideration of position information, azimuth information, and altitude information of the antenna alignment guide device 2, which are provided from the sensor unit 22, and position information and altitude information of other side communication equipment, which are provided from the user interface unit 24, the MCU 21 of the antenna alignment guide device 2 outputs information on an installation direction of the antenna alignment guide device 2 (i.e., horizontal azimuth and vertical inclination) at a position of other side communication equipment via the user interface unit 24. Accordingly, the azimuth of the other side communication equipment (i.e., the corresponding antenna alignment guide device) and azimuth for a required installation direction may be displayed on the user interface unit 24, and the worker confirms the output information to adjust an installation direction of the communication equipment 1 (horizontal azimuth and vertical inclination).

As shown in FIG. 6, it can be seen that a structure of the antenna alignment guide device 2 according to the second embodiment includes a processor such as the MCU 21 in the antenna alignment guide device 2 to process itself the sensed information of the sensor unit 22 and the input information of the user interface unit 24, and a user controls a display operation of the user interface unit 24. The antenna alignment guide device 2 may notify the result of the above-described operation to an MCU 11 of the communication equipment 1.

Similar to the operation of the first embodiment, the MCU 11 of the communication equipment 1 may measure an RSSI of the communication equipment 1 and provide the measured RSSI to the MCU 21 of the antenna alignment guide device 2. The MCU 21 of the antenna alignment guide device 2 may also control information on the RSSI provided to the MCU 11 of the communication equipment 1 to be displayed through the user interface unit 24, and the worker may adjust more precisely the installation direction of the communication equipment 1 on the basis of the RSSI information.

FIG. 7 is a schematic block diagram of an antenna alignment guide device and related communication equipment according to a third embodiment of the present disclosure. Referring to FIG. 7, like the configuration according to the second embodiment shown in FIG. 6, an antenna alignment guide device 2 according to the third embodiment of the present disclosure includes a sensor unit 22, a user interface unit 24, and an MCU 21 provided as a control unit. Further, the antenna alignment guide device 2 may be installed at a communication equipment 1 through a fixing device 4.

However, in a structure according to the third embodiment shown in FIG. 7, the antenna alignment guide device 2 is not connected to a communication equipment 1 through the communication interface 3 shown in FIG. 6. That is, it can be seen that this structure is a structure in which the MCU 21 of the antenna alignment guide device 2 and an MCU 11 of the communication equipment 1 do not communicate with each other.

Like the antenna alignment guide device 2 according to the second embodiment shown in FIG. 6, this structure performs an operation of outputting information on an installation direction of the antenna alignment guide device 2 to a worker using position information, azimuth information, and altitude information of the antenna alignment guide device 2 and position information and altitude information of other side communication equipment, but this structure does not perform an operation of using a sensed signal for an additional fine adjustment.

FIG. 8 is a flowchart illustrating the alignment task of communication equipment using the antenna alignment guide device according to some embodiments of the present disclosure, and for example, the alignment task may be performed using the antenna alignment guide device according to the first or second embodiment. Referring to FIG. 8, when an antenna alignment guide device is installed at communication equipment, position information (and altitude information) of other side antenna alignment guide device is first input in Operation 502.

Then, horizontal azimuth (and vertical inclination) of the antenna alignment guide device is adjusted in Operation 504. After the adjustment of the horizontal azimuth (and vertical inclination) of the antenna alignment guide device is completed, a measured result of an RSSI of an antenna is determined in Operation 506. Thereafter, the determined RSSI of the antenna is compared with a predetermined reference value, which is preset in a stable range, in Operation 508. For example, as the comparison result in Operation 508, when the RSSI is determined as not being equal to or greater than the predetermined reference value, the process proceeds to Operation 504 to finely readjust the horizontal azimuth (and vertical inclination) of the antenna alignment guide device and repeat the above-described Operations. As the comparison result in Operation 508, when the RSSI is determined as being equal to or greater than the predetermined reference value, the alignment task is completed.

When communication equipment (antenna) is installed and fixed to a supporting pillar, the antenna alignment method using the antenna alignment guide device according to the embodiments of the present disclosure is suitable for temporarily assisting a communication equipment installation task of a user (worker). When the communication equipment is installed, the worker installs the antenna alignment guide device at the communication equipment, and after the communication equipment is installed, the worker detaches the antenna alignment guide device from the communication equipment. The worker can carry the antenna alignment guide device according to the embodiments of the present disclosure and can repeatedly use the antenna alignment guide device when installing a plurality of communication equipment. As described above, the present disclosure can provide a simplified, cost-effective, and optimal method for assisting the worker when the worker performs a task for installing communication equipment, such as an antenna of a base station antenna of a conventional mobile communication network, which is fixedly installed.

As described above, the configuration of the antenna alignment guide device according to one embodiment of the present disclosure, and the alignment operation using the antenna alignment guide device can be implemented, and while the present disclosure has been described with reference to the exemplary embodiments, various modification can be practiced without departing from the scope of the present disclosure. For example, at least some of the detailed configurations of each of the above-described embodiments can be similarly applied to other embodiments, and at least some of detailed configurations of each of the embodiments can be omitted. Further, at least some of the detailed configurations of these embodiments can be combined.

Furthermore, in the above description, the installation direction of the communication equipment at the supporting pillar is manually adjusted by the user, but the embodiments of the present disclosure can also be applied to a technique for automatically adjusting an installation direction of the communication equipment in the future.

For example, in order to automatically adjust an installation direction in response to an external control signal, corresponding communication equipment can be implemented with electric driving devices and related mechanical devices to implement a fixed device for fixing the communication equipment to the supporting pillar. In such a case, the antenna alignment guide device of the present disclosure (or communication equipment receiving information from such an antenna alignment guide device) can be configured to output an appropriate operation control signal to the fixing device.

In addition to the foregoing, various alternations and modifications of the present disclosure can be made, and therefore, the scope of the present disclosure should be defined by the appended claims and equivalents thereof instead of the above-described embodiments.

The invention claimed is:

1. An antenna alignment guide device, comprising:
   a sensor unit configured to sense information on a position of a first communication equipment;
   a user interface unit configured to display the information on the position sensed by the sensor unit and receive an operation setting input; and
   a fixing device configured to detachably fix the antenna alignment guide device at a predetermined portion of the first communication equipment,
   wherein the antenna alignment guide device is equipped with communication interface which comprises a communication cable and a connector,
   wherein the antenna alignment guide device is configured to receive a first signal comprising position information indicating a position of a second communication equipment from the first communication equipment through the communication interface, wherein the antenna alignment guide device is further configured to cause the user interface unit to display the position of the second communication equipment based on the position information, and wherein the sensor unit and the user interface unit are configured to communicate with a control unit of the first communication equipment via the communication interface to receive a control signal for the sensor unit or the user interface unit.

2. The antenna alignment guide device of claim 1, wherein the sensor unit includes:
   a true north sensor configured to sense an azimuth of the first communication equipment; and
   a global positioning system (GPS) sensor configured to sense the position of the first communication equipment.

3. The antenna alignment guide device of claim 2, wherein the sensor unit further include an altitude sensor configured to sense an installed height of the first communication equipment.

4. The antenna alignment guide device of claim 1, wherein the user interface unit includes:
   a display unit configured to display the information on the position sensed by the sensor unit to a user; and
   a touch screen including an input unit configured to receive an operation setting input and the position information en-indicating the position of the second communication equipment.

5. The antenna alignment guide device of claim 1, further comprising:
   a control unit configured to collectively control an operation of the antenna alignment guide device,
   wherein the control unit performs an operation of outputting information on an installation direction of the antenna alignment guide device via the user interface unit so as to direct the antenna alignment guide device to the position of the second communication equipment using the position information, which is provided from the sensor unit, and the position information of the second communication equipment.

6. The antenna alignment guide device of claim 5, wherein:
   the sensor unit further includes an altitude sensor configured to sense an installed height of the first communication equipment; and
   the control unit performs an operation of outputting the information on the installation direction of the antenna alignment guide device via the user interface unit using altitude information provided from the sensor unit and an altitude of the second communication equipment.

7. The antenna alignment guide device of claim 1, wherein the antenna alignment guide device is configured to receive and display received signal strength indicator (RSSI) information from the first communication equipment.

8. An antenna alignment guide device, comprising:
   a sensor unit configured to sense information on a position of a first antenna;
   a user interface unit configured to display the information on the position sensed by the sensor unit and receive an operation setting input; and
   a fixing device configured to detachably fix the antenna alignment guide device at a predetermined portion of a first antenna,
   wherein the antenna alignment guide device is equipped with communication interface which comprises a communication cable and a connector,
   wherein the antenna alignment guide device is configured to receive a first signal comprising position information indicating a position of a second antenna from the first antenna through the communication interface,
   wherein the antenna alignment guide device is further configured to cause the user interface unit to display the position of the second antenna based on the position information, and
   wherein the sensor unit and the user interface unit are configured to communicate with a control unit of the first antenna via the communication interface to receive a control signal for the sensor unit or the user interface unit.

9. The antenna alignment guide device of claim 8, wherein the sensor unit includes:
   a true north sensor configured to sense an azimuth of the first antenna; and
   a global positioning system (GPS) sensor configured to sense the position of the first antenna.

10. The antenna alignment guide device of claim 9, wherein the sensor unit further include an altitude sensor configured to sense an installed height of the first antenna.

11. The antenna alignment guide device of claim 8, wherein the user interface unit includes:
    a display unit configured to display the information on the position sensed by the sensor unit to a user; and
    a touch screen including an input unit configured to receive an operation setting input and position information indicating the position of the second antenna.

12. The antenna alignment guide device of claim 8, further comprising:
    a control unit configured to collectively control an operation of the antenna alignment guide device,
    wherein the control unit performs an operation of outputting information on an installation direction of the antenna alignment guide device via the user interface unit so as to direct the antenna alignment guide device to the position of the second antenna using the position information, which is provided from the sensor unit, and the position information of the second antenna.

13. The antenna alignment guide device of claim 12, wherein:
    the sensor unit further includes an altitude sensor configured to sense an installed height of the first antenna; and
    the control unit performs an operation of outputting the information on the installation direction of the antenna alignment guide device via the user interface unit using altitude information provided from the sensor unit and an altitude of the second antenna.

14. The antenna alignment guide device of claim 8, wherein the antenna alignment guide device is configured to receive and display received signal strength indicator (RSSI) information from the first antenna.

15. An antenna, comprising a fixing portion configured to be fixed to an antenna alignment guide device,
    wherein the antenna alignment guide device, comprises:
    a sensor unit configured to sense information on a position of the antenna;
    a user interface unit configured to display the information on the position sensed by the sensor unit and receive an operation setting input; and
    a fixing device configured to detachably fix the antenna alignment guide device at a predetermined portion of the antenna,
    wherein the antenna comprises communication interface which is connectable to a communication cable and a connector of the antenna alignment guide device, wherein the antenna is configured to transmit a first signal comprising position information indicating a position of another antenna through the communication interface to allow the user interface unit of the antenna alignment guide device to display the position of the another antenna based on the position information, wherein the antenna comprises a control unit which is configured to communicate with the sensor unit and the user interface unit of the antenna alignment guide device via the communication interface to transmit a control signal for the sensor unit or the user interface unit.

16. The antenna of claim 15, wherein the sensor unit includes:
   a true north sensor configured to sense an azimuth of the antenna; and
   a global positioning system (GPS) sensor configured to sense the position of the antenna.

17. The antenna of claim 16, wherein the sensor unit further include an altitude sensor configured to sense an installed height of the antenna.

18. The antenna of claim 15, wherein the user interface unit includes:
   a display unit configured to display the information on the position sensed by the sensor unit to a user; and
   a touch screen including an input unit configured to receive an operation setting input and the position information indicating the position of the another antenna.

* * * * *